United States Patent
Oguri et al.

(10) Patent No.: US 7,128,683 B2
(45) Date of Patent: Oct. 31, 2006

(54) POWER TRANSMISSION MECHANISM

(75) Inventors: Kazuo Oguri, Hiroshima (JP); Ikuo Okamoto, Hiroshima (JP)

(73) Assignee: JATCO Ltd, Fuji (JP)

( * ) Notice: Subject to any disclaimer, the term of this patent is extended or adjusted under 35 U.S.C. 154(b) by 190 days.

(21) Appl. No.: 10/988,700

(22) Filed: Nov. 16, 2004

(65) Prior Publication Data

US 2005/0113205 A1 May 26, 2005

(30) Foreign Application Priority Data

Nov. 21, 2003 (JP) ............... 2003-392818

(51) Int. Cl.
*F16H 3/62* (2006.01)
(52) U.S. Cl. .................... 475/276
(58) Field of Classification Search ........ 475/276, 475/278

See application file for complete search history.

(56) References Cited

U.S. PATENT DOCUMENTS 6,176,803 B1 * 1/2001 Meyer et al. ............ 475/286
6,302,820 B1 10/2001 Ried

FOREIGN PATENT DOCUMENTS

JP 2000-266138 A 9/2000

* cited by examiner

*Primary Examiner*—Dirk Wright
(74) *Attorney, Agent, or Firm*—Foley & Lardner LLP

(57) ABSTRACT

A power transmission mechanism for an automatic transmission, configured to establish seven or more forward speeds and one reverse speed. The power transmission mechanism includes four simple planetary gears, three connection members interconnecting two of the rotating members of the planetary gears, three clutches selectively connectable between two of the rotating members, and four brakes each operable to hold selectively against rotation one of the rotating members.

10 Claims, 13 Drawing Sheets

|  | B1 | C1 | C2 | C3 | B5 | B2 | B3 | B4 | F1 | F3 | F2 |
|---|---|---|---|---|---|---|---|---|---|---|---|
| 1st | ○ |  |  | ○ | ○ | ○ |  |  | (○) | (○) | (○) |
| 2nd |  |  |  | ○ | ○ | ○ | ○ |  |  | (○) | (○) |
| 3rd |  |  | ○ |  | ○ | ○ | ○ |  |  | (○) |  |
| 4th |  |  | ○ | ○ |  |  | ○ |  |  |  |  |
| 5th |  | ○ | ○ | ○ |  |  |  |  |  |  |  |
| 6th |  | ○ |  | ○ |  |  | ○ |  |  |  |  |
| 7th | ○ | ○ |  | ○ |  |  |  |  | (○) |  |  |
| Rev. | ○ |  |  | ○ |  |  |  | ○ |  |  |  |

FIG.12A

CASE 1

| GEAR RATIO | | STEP RATIO | |
|---|---|---|---|
| 1ST | 4.6837 | 1ST/2ND | 1.5305 |
| 2ND | 3.0602 | 2ND/3RD | 1.5179 |
| 3RD | 2.0161 | 3RD/4TH | 1.4516 |
| 4TH | 1.3889 | 4TH/5TH | 1.3889 |
| 5TH | 1.0000 | 5TH/6TH | 1.1682 |
| 6TH | 0.8560 | 6TH/7TH | 1.1283 |
| 7TH | 0.7588 | | |
| REV | 3.5384 | 1ST/7TH | 6.1738 |
| $\alpha 1$ | 0.5278 | 1ST/REV | 0.7555 |
| $\alpha 2$ | 0.3889 | | |
| $\alpha 3$ | 0.4516 | | |
| $\alpha 4$ | 0.5179 | | |

FIG.12B

CASE 2

| GEAR RATIO | | STEP RATIO | |
|---|---|---|---|
| 1ST | 5.6813 | 1ST/2ND | 1.6047 |
| 2ND | 3.5403 | 2ND/3RD | 1.5836 |
| 3RD | 2.2642 | 3RD/4TH | 1.5385 |
| 4TH | 1.4717 | 4TH/5TH | 1.4717 |
| 5TH | 1.0000 | 5TH/6TH | 1.1991 |
| 6TH | 0.8340 | 6TH/7TH | 1.1326 |
| 7TH | 0.7363 | | |
| REV | 3.8028 | 1ST/7TH | 7.7156 |
| $\alpha 1$ | 0.5300 | 1ST/REV | 0.6694 |
| $\alpha 2$ | 0.4717 | | |
| $\alpha 3$ | 0.5385 | | |
| $\alpha 4$ | 0.5636 | | |

FIG.12C

CASE 3

| GEAR RATIO | | STEP RATIO | |
|---|---|---|---|
| 1ST | 6.3508 | 1ST/2ND | 1.6531 |
| 2ND | 3.8417 | 2ND/3RD | 1.6327 |
| 3RD | 2.3530 | 3RD/4TH | 1.5385 |
| 4TH | 1.5294 | 4TH/5TH | 1.5294 |
| 5TH | 1.0000 | 5TH/6TH | 1.1915 |
| 6TH | 0.8393 | 6TH/7TH | 1.1199 |
| 7TH | 0.7494 | | |
| REV | 4.5702 | 1ST/7TH | 8.4745 |
| $\alpha 1$ | 0.5300 | 1ST/REV | 0.7196 |
| $\alpha 2$ | 0.5294 | | |
| $\alpha 3$ | 0.5385 | | |
| $\alpha 4$ | 0.6327 | | |

|     | B1 | C1 | C2 | C3 | B5 | B2 | B3 | B7 | B6 | B4 | F1 | F3 | F2 |
|-----|----|----|----|----|----|----|----|----|----|----|----|----|----|
| 1st | O  |    |    | O  | O  | O  |    | O  |    |    | (O)| (O)| (O)|
| 2nd |    |    |    | O  | O  | O  | O  | O  |    |    |    | (O)| (O)|
| 3rd |    |    | O  |    | O  | O  | O  | O  |    |    |    | (O)|    |
| 4th |    |    | O  | O  |    |    | O  | O  |    |    |    |    |    |
| 5th |    | O  | O  | O  |    |    |    | O  |    |    |    |    |    |
| 6th |    | O  |    | O  |    |    | O  | O  |    |    |    |    |    |
| 7th | O  | O  |    | O  |    |    |    | O  |    |    | (O)|    |    |
| 8th |    | O  |    | O  |    |    |    |    | O  |    |    |    |    |
| Rev.| O  |    |    | O  |    |    | O  |    |    | O  |    |    |    |

CASE 1

| GEAR RATIO | | STEP RATIO | |
|---|---|---|---|
| 1ST | 5.6813 | 1ST/2ND | 1.6047 |
| 2ND | 3.5403 | 2ND/3RD | 1.5636 |
| 3RD | 2.2642 | 3RD/4TH | 1.5385 |
| 4TH | 1.4717 | 4TH/5TH | 1.4717 |
| 5TH | 1.0000 | 5TH/6TH | 1.1991 |
| 6TH | 0.8340 | 6TH/7TH | 1.1326 |
| 7TH | 0.7363 | 7TH/8TH | 1.1936 |
| 8TH | 0.6169 | | |
| REV | 3.8028 | 1ST/7TH | 7.7156 |
| $\alpha 1$ | 0.5300 | 1ST/8TH | 9.2096 |
| $\alpha 2$ | 0.4717 | 1ST/REV | 0.6694 |
| $\alpha 3$ | 0.5385 | | |
| $\alpha 4$ | 0.5636 | | |

CASE 2

| GEAR RATIO | | STEP RATIO | |
|---|---|---|---|
| 1ST | 6.3508 | 1ST/2ND | 1.6531 |
| 2ND | 3.8417 | 2ND/3RD | 1.6327 |
| 3RD | 2.3530 | 3RD/4TH | 1.5385 |
| 4TH | 1.5294 | 4TH/5TH | 1.5294 |
| 5TH | 1.0000 | 5TH/6TH | 1.1915 |
| 6TH | 0.8393 | 6TH/7TH | 1.1199 |
| 7TH | 0.7494 | 7TH/8TH | 1.1640 |
| 8TH | 0.6438 | | |
| REV | 4.5702 | 1ST/7TH | 8.4745 |
| $\alpha 1$ | 0.5300 | 1ST/8TH | 9.8641 |
| $\alpha 2$ | 0.5294 | 1ST/REV | 0.7196 |
| $\alpha 3$ | 0.5385 | | |
| $\alpha 4$ | 0.6327 | | |

|      | B1 | C1 | C2 | C3 | B5 | B2 | B3 | B8 | B4 | F1  | F4  | F3  | F2  |
|------|----|----|----|----|----|----|----|----|----|-----|-----|-----|-----|
| 1st  | ○  |    |    | ○  | ○  | ○  |    |    |    | (○) |     | (○) | (○) |
| 2nd  |    |    |    | ○  | ○  | ○  | ○  | ○  |    |     | (○) | (○) | (○) |
| 3rd  |    |    | ○  |    | ○  | ○  | ○  | ○  |    |     | (○) | (○) |     |
| 4th  |    |    | ○  | ○  |    |    | ○  | ○  |    |     | (○) |     |     |
| 5th  |    | ○  | ○  | ○  |    |    |    |    |    |     |     |     |     |
| 6th  |    | ○  |    | ○  |    |    | ○  | ○  |    |     | (○) |     |     |
| 7th  | ○  | ○  |    | ○  |    |    |    |    |    | (○) |     |     |     |
| Rev. | ○  |    |    | ○  |    |    |    |    | ○  |     |     |     |     |

|  | B1 | C1 | C2 | C3 | B5 | B2 | B3 | B8 | B7 | B6 | B4 | F1 | F4 | F3 | F2 |
|---|---|---|---|---|---|---|---|---|---|---|---|---|---|---|---|
| 1st | O |  |  | O | O | O |  |  | O |  |  | (O) |  | (O) | (O) |
| 2nd |  |  |  | O | O | O | O | O | O |  |  | (O) | (O) | (O) |  |
| 3rd |  |  | O |  | O | O | O | O | O |  |  | (O) | (O) |  |  |
| 4th |  |  | O | O |  |  | O | O | O |  |  | (O) |  |  |  |
| 5th |  | O | O | O |  |  |  |  | O |  |  |  |  |  |  |
| 6th |  | O |  | O |  |  | O | O | O |  |  | (O) |  |  |  |
| 7th | O | O |  | O |  |  |  |  | O |  |  | (O) |  |  |  |
| 8th |  | O |  | O |  |  |  |  |  | O |  |  |  |  |  |
| Rev. | O |  |  | O |  |  |  |  | O |  | O |  |  |  |  |

POWER TRANSMISSION MECHANISM

BACKGROUND OF THE INVENTION

The present invention relates generally to automatic transmissions for automotive vehicles, and more particularly to a power transmission mechanism for an automatic transmission, configured to establish seven or more forward speeds and one or more reverse speed.

A Published Japanese Patent Application Publication No. 2000-266138 (hereinafter referred to as "JP2000-266138") shows a power transmission mechanism for an automatic transmission, configured to establish seven forward speeds and one reverse speed. This power transmission mechanism includes a compound planetary gearset as an input section, a pair of planetary gears as an output section, three clutches, a one-way clutch, and four brakes. The compound planetary gearset on the input side includes a sun gear, a ring gear, a secondary ring gear, and a planet-pinion carrier supporting a short planet pinion in mesh with the secondary ring gear and a long planet pinion in mesh with the short pinion and the sun gear on the input side and with the ring gear on the other side. The power transmission mechanism is configured so that gear shift from one speed to another next speed is performed by changing only one of the engagement states of the torque transmitting mechanisms including the clutches and the brakes.

SUMMARY OF THE INVENTION

The conventional power transmission mechanism shown in JP2000-266138 is confronted with the following problems. (1) First, there are problems about the constituent gears of the input planetary gearset. (a) The input planetary gearset includes an intricate planet-pinion carrier which is difficult to machine, to increase the manufacturing cost, and to decrease the positioning accuracies of the constituent gears to generate a gear noise, because the input planetary gearset is a double-pinion planetary gear which includes a planet-pinion carrier with a more intricate structure than a single-pinion planetary gear. (b) The input planetary gearset includes an intricate long planet pinion whose teeth are difficult to machine, to generate a gear noise, because the long planet pinion is in mesh with the short pinion and the sun gear on the input side and with the ring gear on the other side. (2) Second, there is problems about the configuration of the shafts of the input planetary gearset. (a) The input planetary gearset includes a multiple shaft configuration in which a shaft other than the input shaft and the output shaft, extending inside the sun gear without connection to the sun gear, to degrade fuel economy, and to upsize the power transmission mechanism, as follows. The conventional power transmission mechanism includes a one-way clutch connected between the planet-pinion carrier and the transmission housing. In case the one-way clutch is disposed on the output side of the input planetary gearset, the fixed shaft connecting the one-way clutch extends inside the sun gear, to cause a friction in accordance with the relative rotation between the shaft and the sun gear in most of the speeds, resulting in a degradation in fuel economy. (b) In addition, in case the one-way clutch is disposed on the output side of the input planetary gearset, lubricating oil is supplied to the outer section of the input planetary gearset via through holes in the outer wall of the shaft rigidly connected to the planet-pinion carrier. This through holes function as orifices, to reduce the flow of the lubricating oil. Therefore, this conventional power transmission mechanism needs a larger amount of lubricating oil, and a higher hydraulic pressure.

It is an object of the present invention to provide a power transmission mechanism for an automatic transmission, configured to establish seven or more forward speeds, and including only a plurality of single-pinion planetary gears as constituent gears, without a multiple shaft configuration.

According to one aspect of the present invention, a power transmission mechanism comprises a first planetary gear including a first sun gear, a first ring gear, and a first planet-pinion carrier carrying a first planet pinion in mesh with the first sun gear, and with the first ring gear, a second planetary gear including a second sun gear, a second ring gear, and a second planet-pinion carrier carrying a second planet pinion in mesh with the second sun gear, and with the second ring gear, a third planetary gear including a third sun gear, a third ring gear, and a third planet-pinion carrier carrying a third planet pinion in mesh with the third sun gear, and with the third ring gear, a fourth planetary gear including a fourth sun gear, a fourth ring gear, and a fourth planet-pinion carrier carrying a fourth planet pinion in mesh with the fourth sun gear, and with the fourth ring gear, a first connection member rigidly coupling the first ring gear, the second planet-pinion carrier, and the fourth ring gear, a second connection member rigidly coupling the third ring gear and the fourth planet-pinion carrier, a third connection member rigidly coupling the first sun gear and the second sun gear, a first clutch selectively connectable between the second ring gear and the third ring gear, a second clutch selectively connectable between the fourth planet-pinion carrier and the fourth sun gear, a third clutch selectively connectable between the third sun gear and the fourth sun gear, a first brake operable to hold selectively against rotation the first planet-pinion carrier, a second brake operable to hold selectively against rotation the third sun gear, a third brake operable to hold selectively against rotation the third connection member, a fourth brake operable to hold selectively against rotation the second connection member, an input shaft connected to the second ring gear, and an output shaft connected to the third planet-pinion carrier. The power transmission mechanism may be configured so that a combination of engaged conditions of the third clutch, the first brake, and the second brake establishes a first speed, a combination of engaged conditions of the third clutch, the second brake, and the third brake establishes a second speed, a combination of engaged conditions of the second clutch, the second brake, and the third brake establishes a third speed, a combination of engaged conditions of the second clutch, the third clutch, and the third brake establishes a fourth speed, a combination of engaged conditions of the first clutch, the second clutch, and the third clutch establishes a fifth speed, a combination of engaged conditions of the first clutch, the third clutch, and the third brake establishes a sixth speed, a combination of engaged conditions of the first clutch, the third clutch, and the first brake establishes a seventh speed, and a combination of engaged conditions of the third clutch, the first brake, and the fourth brake establishes a reverse speed.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

FIG. 12A shows in tabular form specific gear ratios established by the power transmission mechanism of FIG. 1 in a first sample case.

FIG. 12B shows in tabular form specific gear ratios established by the power transmission mechanism of FIG. 1 in a second sample case.

FIG. 12C shows in tabular form specific gear ratios established by the power transmission mechanism of FIG. 1 in a third sample case.

DETAILED DESCRIPTION OF THE INVENTION

Figures 1, 2:
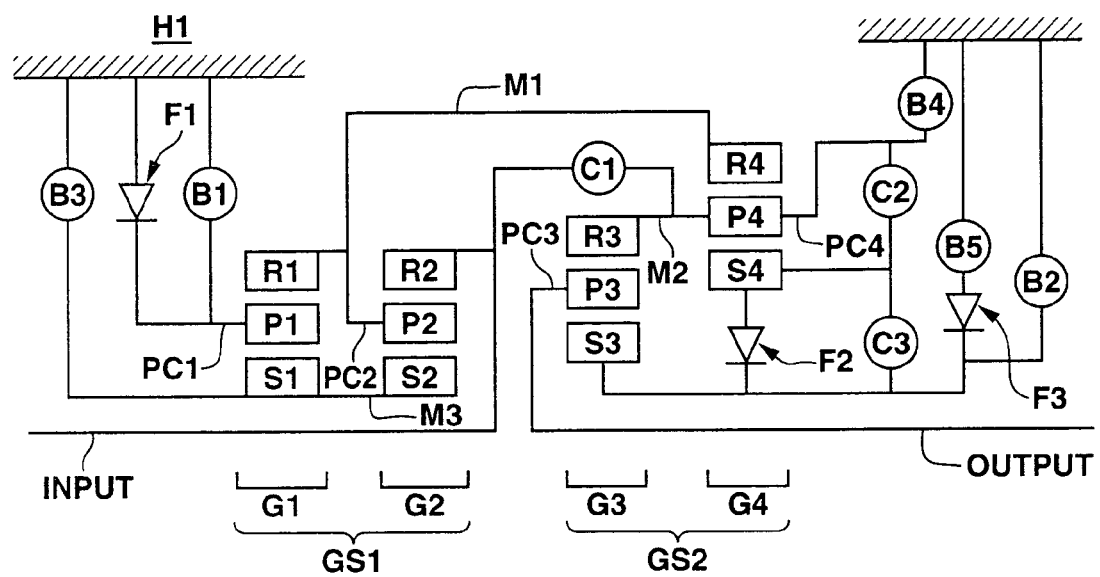
FIG. 1 is a schematic diagram depicting a power transmission mechanism of an automatic transmission for a front-engine, rear-drive vehicle, configured to establish seven forward speeds and one reverse speed, in accordance with a first embodiment of the present invention.
FIG. 2 shows in tabular form clutch and brake engagements required to establish the seven forward speeds and the reverse speed in the power transmission mechanism of FIG. 1.

FIG. 1 is a schematic diagram depicting a power transmission mechanism of an automatic transmission for a front-engine, rear-drive vehicle, configured to establish seven forward speeds and one reverse speed, in accordance with a first embodiment of the present invention. There are arranged a first planetary gearset GS1 including a first planetary gear G1 and a second planetary gear G2, nearer to an input shaft INPUT (on the left side of FIG. 1), and a second planetary gearset GS2 including a third planetary gear G3 and a fourth planetary gear G4, nearer to an output shaft OUTPUT (on the right side of FIG. 1). In a transmission housing H1 are mounted a plurality of torque transmitting devices. More specifically, a first clutch C1, a second clutch C2, a third clutch C3, a first brake B1, a second brake B2, a third brake B3, a fourth brake B4, and a fifth brake B5 are disposed in transmission housing H1. In addition, a plurality of one-way clutches including a first one-way clutch F1, a second one-way clutch F2, and a third one-way clutch F3 are disposed in transmission housing H1.

First planetary gear G1 is a simple planetary gear or a single-pinion planetary gear, including a first sun gear S1, a first ring gear R1, and a first planet-pinion carrier PC1 carrying a first planet pinion P1 in mesh with first sun gear S1 and with first ring gear R1. Second planetary gear G2 is a simple planetary gear or a single-pinion planetary gear, including a second sun gear S2, a second ring gear R2, and a second planet-pinion carrier PC2 carrying a second planet pinion P2 in mesh with second sun gear S2 and with second ring gear R2. Third planetary gear G3 is a simple planetary gear or a single-pinion planetary gear, including a third sun gear S3, a third ring gear R3, and a third planet-pinion carrier PC3 carrying a third planet pinion P3 in mesh with third sun gear S3 and with third ring gear R3. Fourth planetary gear G4 is a simple planetary gear or a single-pinion planetary gear, including a fourth sun gear S4, a fourth ring gear R4, and a fourth planet-pinion carrier PC4 carrying a fourth planet pinion P4 in mesh with fourth sun gear S4 and with fourth ring gear R4.

Input shaft INPUT is connected to second ring gear R2, and to a torque converter (not shown), to transmit a torque from an engine (not shown) to second ring gear R2. Output shaft OUTPUT is connected to third planet-pinion carrier PC3, and to a final gear (not shown), to transmit a driving torque from third planet-pinion carrier PC3 to drive wheels (not shown).

Some of the rotating members of the four planetary gears are interconnected via three connection members including a first connection member M1, a second connection member M2, and a third connection member M3. First connection member M1 solidly couples first ring gear R1, second planet-pinion carrier PC2, and fourth ring gear R4. Second connection member M2 solidly couples third ring gear R3, and fourth planet-pinion carrier PC4. Third connection member M3 solidly couples first sun gear S1, and second sun gear S2.

As discussed above, first planetary gearset GS1 includes first planetary gear G1 and second planetary gear G2 which are interconnected via first connection member M1 and via third connection member M3. On the other hand, second planetary gearset GS2 includes third planetary gear G3 and fourth planetary gear G4 which are interconnected via second connection member M2.

First planetary gearset GS1 includes a member as a path for torque transmission between input shaft INPUT and second ring gear R2. The input torque input to first planetary gearset GS1 is output to second planetary gearset GS2 via first connection member M1.

Second planetary gearset GS2 includes a member as a path for torque transmission between input shaft INPUT and second connection member M2, and a member as a path for torque transmission between first connection member M1 and fourth ring gear R4. The torque input to second planetary gearset GS2 is output to output shaft OUTPUT via third planet-pinion carrier PC3. With third clutch C3 disengaged, second one-way clutch F2 inhibits a relative forward rotation of third sun gear S3 with respect to fourth sun gear S4. While the rotational speed of fourth sun gear S4 exceeds the rotational speed of third sun gear S3, third planetary gear G3 and fourth planetary gear G4 have independent gear ratios, connected to each other via second connection member M2.

First clutch C1 is selectively connectable between input shaft INPUT and second connection member M2. Second clutch C2 is selectively connectable between fourth sun gear S4 and fourth planet-pinion carrier PC4. Third clutch C3 is selectively connectable between third sun gear S3 and fourth sun gear S4. As discussed above, second one-way clutch F2 is disposed between third sun gear S3 and fourth sun gear S4. The combination of third clutch C3 and second one-way clutch F2 as a whole may be referred to as "third clutch C3."

First brake B1 is operable to selectively hold against rotation first planet-pinion carrier PC1. First one-way clutch F1 is disposed in parallel with first brake B1. The combination of first brake B1 and first one-way clutch F1 as a whole may be referred to as "first brake B1." Second brake B2 is operable to selectively hold against rotation third sun gear S3. Third brake B3 is operable to selectively hold against rotation third connection member M3 (first sun gear S1 and second sun gear S2). Fourth brake B4 is operable to selectively hold against rotation fourth planet-pinion carrier PC4. Fifth brake B5 is operable to selectively hold against rotation third sun gear S3, disposed in series with third one-way clutch F3, and in parallel with second brake B2.

The combination of second brake B2, fifth brake B5, and third one-way clutch F3 as a whole may be referred to as "second brake B2."

Clutches C1, C2, and C3, and brakes B1, B2, and B3 are connected to a transmission controller (not shown) as a transmission controlling means for supplying a pressure to engage or a pressure to disengage clutches and brakes in accordance with clutch and brake engagements required to establish seven forward speeds and one reverse speed. The transmission controller may be of the hydraulic control type, of the electronic control type, or of the electrohydraulic control type.

Figure 3:
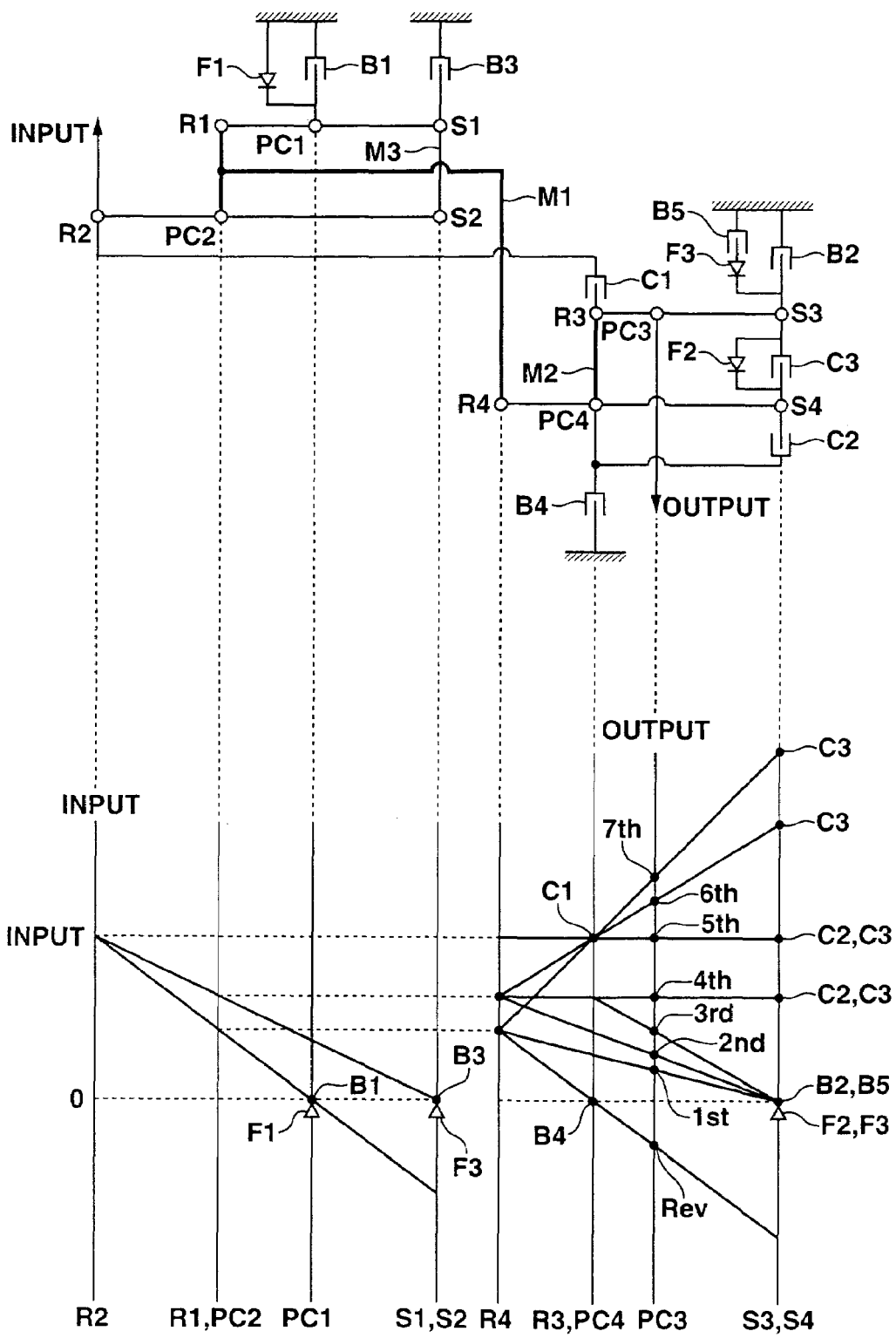
FIG. 3 is a lever diagram depicting the rotational speeds of the rotating members of the power transmission mechanism of FIG. 1 in each speed.

Referring now to FIGS. 2 through 11, the following describes the operation of the power transmission mechanism in accordance with the first embodiment of the present invention. FIG. 2 shows in tabular form clutch and brake engagements required to establish the seven forward speeds and the reverse speed in the power transmission mechanism of FIG. 1. In FIG. 2, a solid circle in a cell indicates that the corresponding clutch, brake, or one-way clutch is engaged in the corresponding speed, and a blank in a cell indicates that the corresponding clutch, brake, or one-way clutch is disengaged in the corresponding speed. FIG. 3 is a lever diagram or a collinear diagram depicting the rotational speeds of the rotating members of the power transmission mechanism of FIG. 1 in each speed. FIGS. 4 through 11 show the power flow or the torque flow within the power transmission mechanism in each speed. In FIGS. 4 through 11, the clutches, the brakes, and the rotating members through which power flows are indicated by bold lines. The gears through which power flows are indicated by a hatch pattern.

The first speed is established by engaging or applying first brake B1, second brake B2, fifth brake B5, and third clutch C3, as shown in FIG. 2. Torque is also transmitted via first one-way clutch F1 in parallel with first brake B1, third one-way clutch F3 in series with fifth brake B5, and second one-way clutch F2 in parallel with third clutch C3.

In the first speed, first, the rotational speed of input shaft INPUT, which is input to second ring gear R2, is reduced at first planetary gearset GS1, with first brake B1 engaged. The reduced speed is output via first connection member M1 to fourth ring gear R4. With second brake B2 engaged and third clutch C3 engaged, the rotational speed input to fourth ring gear R4 is further reduced at second planetary gearset GS2. The reduced speed is output via third planet-pinion carrier PC3 to output shaft OUTPUT.

The lever diagram of the power transmission mechanism as shown in FIG. 3 provides another analysis of the first speed. The point identified by B1 in the lever diagram, or the engagement point of first brake B1 indicates the engagement of first brake B1 with which first planet-pinion carrier PC1 is held stationary. The point identified by B2 in the lever diagram, or the engagement point of second brake B2 indicates the engagement of second brake B2 with which third sun gear S3 is held stationary. The operation of first planetary gearset GS1 is represented by the lever or straight line connecting the input point at second ring gear R2 and the engagement point of first brake B1. The intersection point of the lever of first planetary gearset GS1 and the perpendicular line at first ring gear R1 indicates the rotational speed of fourth ring gear R4. The operation of second planetary gearset GS2 is represented by the lever or straight line connecting the input point at fourth ring gear R4 and the engagement point of second brake B2. The intersection point of the lever of second planetary gearset GS2 and the perpendicular line at output shaft OUTPUT indicates the output speed. In the first speed, the rotational speed of input shaft INPUT is reduced to a point identified by 1st in the lever diagram through the power transmission mechanism, and is output to output shaft OUTPUT.

Figure 4:
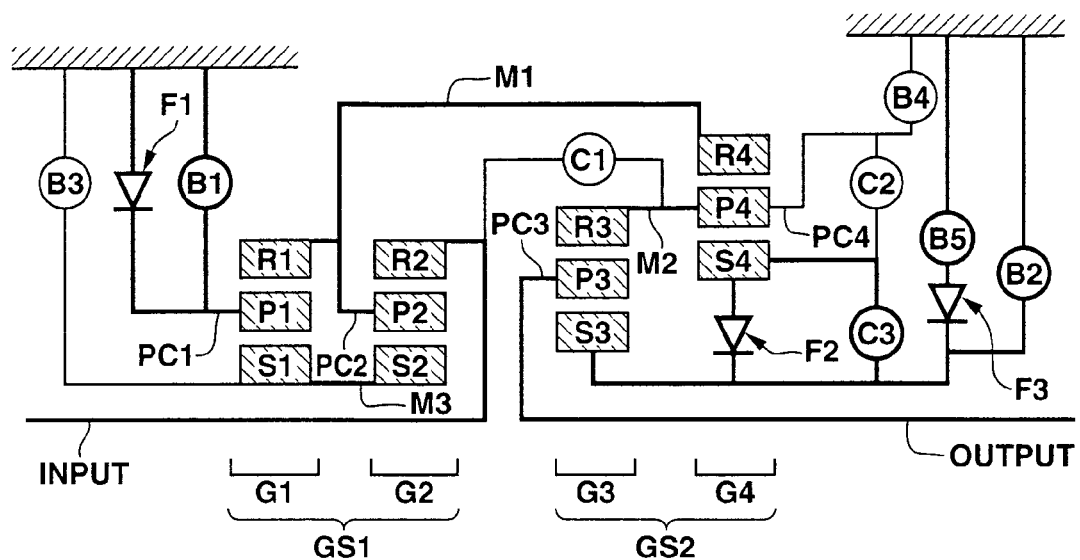
FIG. 4 is a schematic diagram depicting a power flow within the power transmission mechanism of FIG. 1 in the first speed.

FIG. 4 shows a power flow or torque flow within the power transmission mechanism in the first speed. Power flows through first brake B1, second brake B2 (fifth brake B5 and third one-way clutch F3, in parallel), third clutch C3, first connection member M1, second connection member M2, and third connection member M3, as shown by bold lines. Accordingly, first planetary gearset GS1 and second planetary gearset GS2 serve for power transmission or torque transmission.

The second speed is established by engaging second brake B2, third brake B3, fifth brake B5, and third clutch C3, as shown in FIG. 2. Torque is also transmitted via third one-way clutch F3 in series with fifth brake B5, and second one-way clutch F2 in parallel with third clutch C3.

In the second speed, with third brake B3 engaged, the rotational speed of input shaft INPUT, which is input to second ring gear R2, is reduced only at second planetary gear G2 in first planetary gearset GS1. The reduced speed is output via first connection member M1 to fourth ring gear R4. With second brake B2 engaged and third clutch C3 engaged, the rotational speed input to fourth ring gear R4 is further reduced at second planetary gearset GS2. The reduced speed is output via third planet-pinion carrier PC3 to output shaft OUTPUT.

The lever diagram of the power transmission mechanism as shown in FIG. 3 provides another analysis of the second speed. The point identified by B3 in the lever diagram, or the engagement point of third brake B3 indicates the engagement of third brake B3 with which third connection member M3 is held stationary. The point identified by B2 in the lever diagram, or the engagement point of second brake B2 indicates the engagement of second brake B2 with which third sun gear S3 is held stationary. The operation of first planetary gearset GS1 is represented by the lever or straight line connecting the input point at second ring gear R2 and the engagement point of third brake B3. The intersection point of the lever of first planetary gearset GS1 and the perpendicular line at first ring gear R1 indicates the rotational speed of fourth ring gear R4. The operation of second planetary gearset GS2 is represented by the lever or straight line connecting the input point at fourth ring gear R4 and the engagement point of second brake B2. The intersection point of the lever of second planetary gearset GS2 and the perpendicular line at output shaft OUTPUT indicates the output speed. In the second speed, the rotational speed of input shaft INPUT is reduced to a point identified by 2nd in the lever diagram through the power transmission mechanism, and is output to output shaft OUTPUT.

Figure 5:
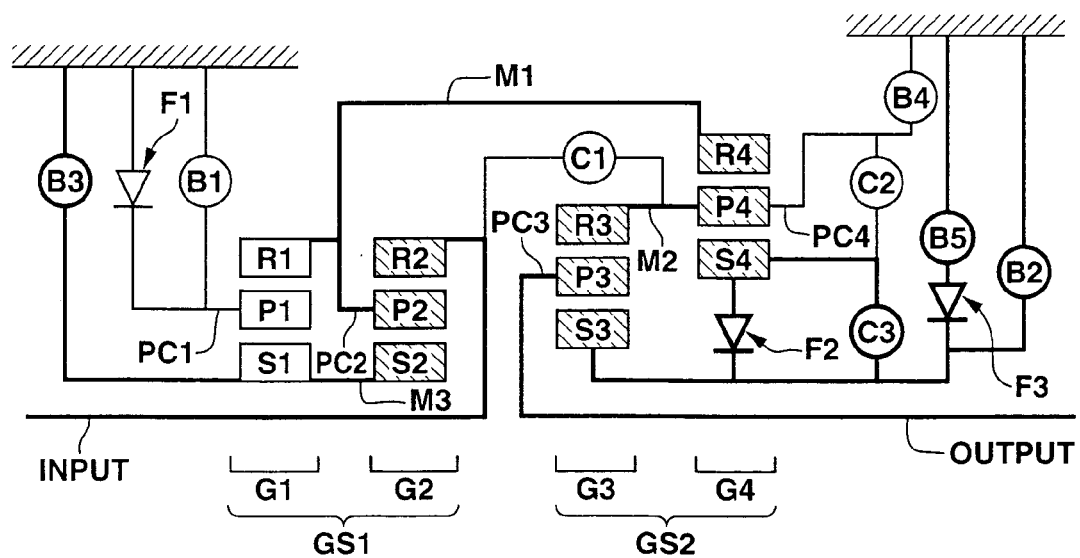
FIG. 5 is a schematic diagram depicting a power flow within the power transmission mechanism of FIG. 1 in the second speed.

FIG. 5 shows a power flow or torque flow within the power transmission mechanism in the second speed. Power flows through third brake B3, second brake B2 (fifth brake B5 and third one-way clutch F3), third clutch C3, first connection member M1, second connection member M2, and third connection member M3, as shown by bold lines. Accordingly, second planetary gear G2 and second planetary gearset GS2 serve for power transmission or torque transmission.

In the gear shift from the first speed to the second speed, the transmission controller disengages first brake B1 in advance of starting to engage third brake B3. After third brake B3 is fully engaged to bear a specific capacity of torque transmission, first one-way clutch F1 is disengaged. In this process, the gear shift is smoothly performed in a suitable timing.

The third speed is established by engaging second brake B2, third brake B3, fifth brake B5, and second clutch C2, as shown in FIG. 2. Torque is also transmitted via third one-way clutch F3 in series with fifth brake B5.

In the third speed, with third brake B3 engaged, the rotational speed of input shaft INPUT, which is input to second ring gear R2, is reduced only at second planetary gear G2 in first planetary gearset GS1. The reduced speed is output via first connection member M1 to fourth ring gear R4. With second clutch C2 engaged, the rotating members of fourth planetary gear G4 rotate solidly with each other. Fourth planet-pinion carrier PC4, which rotates solidly with fourth ring gear R4, outputs the rotational speed via second connection member M2 to third ring gear R3. With second brake B2 engaged, the rotational speed input to third ring gear R3 is further reduced at third planetary gear G3. The reduced speed is output via third planet-pinion carrier PC3 to output shaft OUTPUT. In this manner, fourth planetary gear G4 serves for torque transmission, but not for speed reducing.

The lever diagram of the power transmission mechanism as shown in FIG. 3 provides another analysis of the third speed. The point identified by B3 in the lever diagram, or the engagement point of third brake B3 indicates the engagement of third brake B3 with which third connection member M3 is held stationary. The point identified by B2 in the lever diagram, or the engagement point of second brake B2 indicates the engagement of second brake B2 with which third sun gear S3 is held stationary. The operation of first planetary gearset GS1 is represented by the lever or straight line connecting the input point at second ring gear R2 and the engagement point of third brake B3. The intersection point of the lever of first planetary gearset GS1 and the perpendicular line at first ring gear R1 indicates the rotational speed of fourth ring gear R4. The operation of second planetary gearset GS2 is represented by the lever or straight line connecting the input point at fourth planet-pinion carrier PC4 and the engagement point of second brake B2. The intersection point of the lever second planetary gearset GS2 and the perpendicular line at output shaft OUTPUT indicates the output speed. In the third speed, the rotational speed of input shaft INPUT is reduced to a point identified by 3rd in the lever diagram through the power transmission mechanism, and is output to output shaft OUTPUT.

Figure 6:
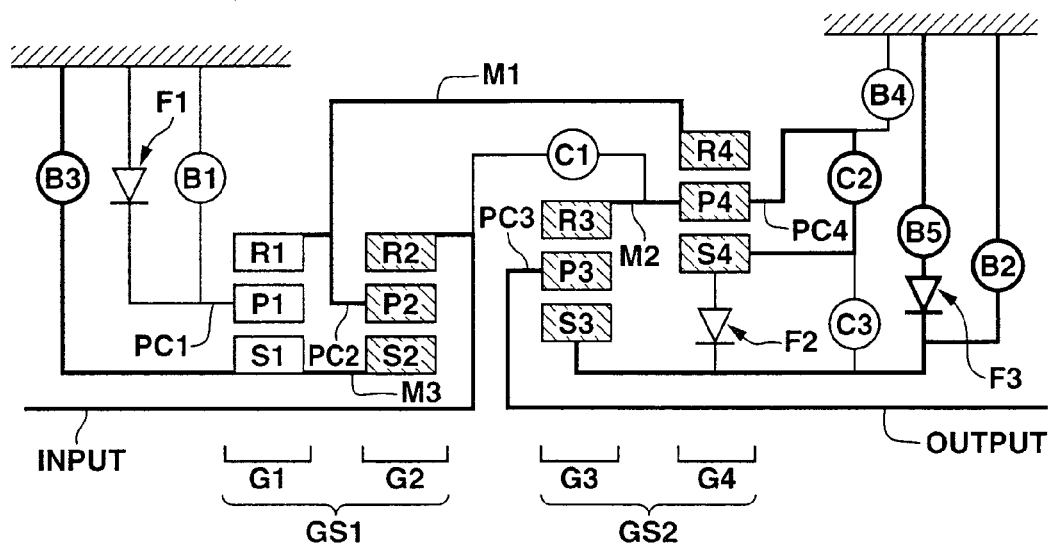
FIG. 6 is a schematic diagram depicting a power flow within the power transmission mechanism of FIG. 1 in the third speed.

FIG. 6 shows a power flow or torque flow within the power transmission mechanism in the third speed. Power flows through third brake B3, second brake B2 (fifth brake B5 and third one-way clutch F3, in parallel), second clutch C2, first connection member M1, second connection member M2, and third connection member M3, as shown by bold lines. Accordingly, second planetary gear G2 and second planetary gearset GS2 serve for power transmission or torque transmission.

In the gear shift from the second speed to the third speed, the transmission controller disengages third clutch C3 in advance of starting to engage second clutch C2. After second clutch C2 is fully engaged to bear a specific capacity of torque transmission, second one-way clutch F2 is disengaged. In this process, the gear shift is smoothly performed in a suitable timing.

The fourth speed is established by engaging third brake B3, second clutch C2, and third clutch C3, as shown in FIG. 2.

In the fourth speed, with third brake B3 engaged, the rotational speed of input shaft INPUT, which is input to second ring gear R2, is reduced only at second planetary gear G2 in first planetary gearset GS1. The reduced speed is output via first connection member M1 to fourth ring gear R4. With second clutch C2 engaged and third clutch C3 engaged, the rotating members of second planetary gearset GS2 rotate solidly with each other. Without further reduced at second planetary gearset GS2, the reduced speed is output via third planet-pinion carrier PC3 to output shaft OUTPUT.

The lever diagram of the power transmission mechanism as shown in FIG. 3 provides another analysis of the fourth speed. The point identified by B3 in the lever diagram, or the engagement point of third brake B3 indicates the engagement of third brake B3 with which third connection member M3 is held stationary. The operation of first planetary gearset GS1 is represented by the lever or straight line connecting the input point at second ring gear R2 and the engagement point of third brake B3. The intersection point of the lever of first planetary gearset GS1 and the perpendicular line at first ring gear R1 indicates the rotational speed of fourth ring gear R4. With second clutch C2 engaged and third clutch C3 engaged, the operation of second planetary gearset GS2 is represented by the lever or straight line extending horizontally through the input point at fourth ring gear R4. The intersection point of the lever of second planetary gearset GS2 and the perpendicular line at output shaft OUTPUT indicates the output speed. In the fourth speed, the rotational speed of input shaft INPUT is reduced to a point identified by 4th in the lever diagram through the power transmission mechanism, and is output to output shaft OUTPUT.

Figure 7:
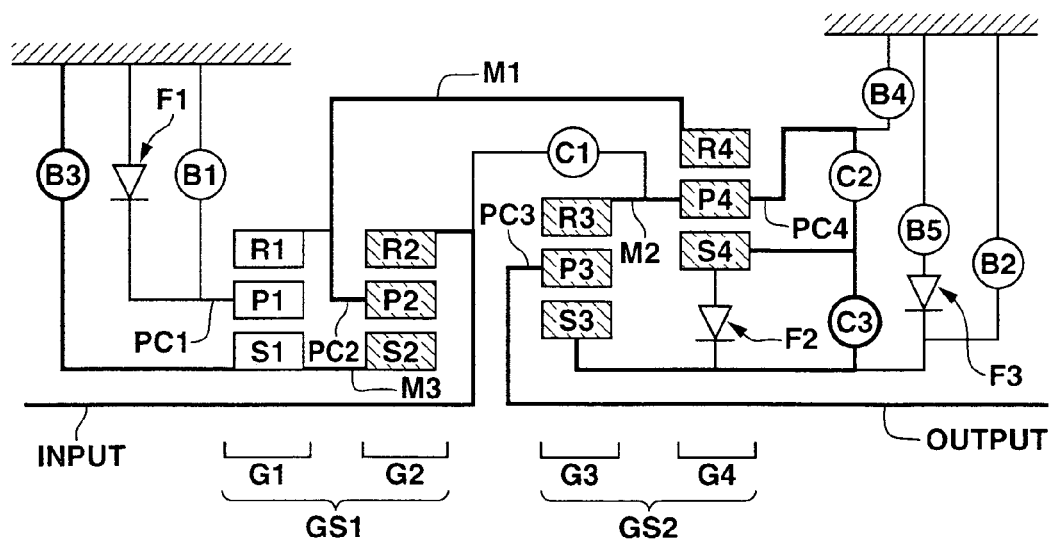
FIG. 7 is a schematic diagram depicting a power flow within the power transmission mechanism of FIG. 1 in the fourth speed.

FIG. 7 shows a power flow or torque flow within the power transmission mechanism in the fourth speed. Power flows through third brake B3, second clutch C2, third clutch C3, first connection member M1, second connection member M2, and third connection member M3, as shown by bold lines. Accordingly, second planetary gear G2 and second planetary gearset GS2 serve for power transmission or torque transmission.

In the gear shift from the third speed to the fourth speed, the transmission controller disengages second brake B2 in advance of starting to engage third clutch C3. After third clutch C3 is fully engaged to bear a specific capacity of torque transmission, third one-way clutch F3 is disengaged. In this process, the gear shift is smoothly performed in a suitable timing.

The fifth speed is established by engaging first clutch C1, second clutch C2, and third clutch C3, as shown in FIG. 2.

In the fifth speed, with first clutch C1 engaged, the rotational speed of input shaft INPUT is input to second connection member M2. With second clutch C2 engaged and third clutch C3 engaged, the rotating members of second planetary gearset GS2 rotate solidly with each other. Accordingly, the input speed is output via third planet-pinion carrier PC3 to output shaft OUTPUT.

The lever diagram of the power transmission mechanism as shown in FIG. 3 provides another analysis of the fifth speed. The operation of second planetary gearset GS2 is represented by the lever or straight line extending horizontally through the input point at second ring gear R2. The intersection point of the lever of second planetary gearset GS2 and the perpendicular line at output shaft OUTPUT indicates the output speed. In the fifth speed, the rotational speed of input shaft INPUT is retained as a point identified by 5th in the lever diagram through the power transmission mechanism, and is output to output shaft OUTPUT.

Figure 8:
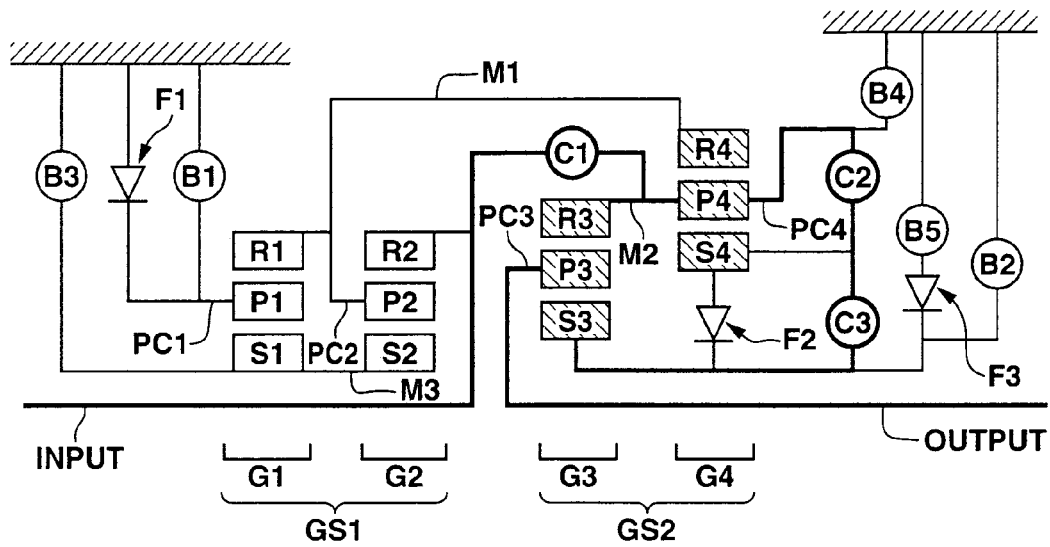
FIG. 8 is a schematic diagram depicting a power flow within the power transmission mechanism of FIG. 1 in the fifth speed.

FIG. 8 shows a power flow or torque flow within the power transmission mechanism in the fifth speed. Power flows through first clutch C1, second clutch C2, third clutch C3, and second connection member M2, as shown by bold lines. Accordingly, only third planetary gear G3 serves for power transmission or torque transmission.

The sixth speed is established by engaging first clutch C1, third clutch C3, and third brake B3, as shown in FIG. 2.

In the sixth speed, with first clutch C1 engaged, the rotational speed of input shaft INPUT is input to second connection member M2. With third brake B3 engaged, the rotational speed reduced at first planetary gearset GS1 is input via first connection member M1 to fourth ring gear R4. With third clutch C3 engaged, the operating state of second planetary gearset GS2 is determined by the rotational speeds of fourth ring gear R4 and second connection member M2, to output a determined rotational speed via third planet-pinion carrier PC3 to output shaft OUTPUT.

The lever diagram of the power transmission mechanism as shown in FIG. 3 provides another analysis of the sixth speed. The operation of first planetary gearset GS1 is represented by the lever connecting the input point and the engagement point of third brake B3. The intersection point of the lever of first planetary gearset GS1 and the perpendicular line at first ring gear R1 indicates the rotational speed of fourth ring gear R4. The operation of second planetary gearset GS2 is represented by the lever connecting the rotational speed of fourth ring gear R4 and the engagement point of first clutch C1. The intersection point of the lever of second planetary gearset GS2 and the perpendicular line at output shaft OUTPUT indicates the output speed. In the sixth speed, the rotational speed of input shaft INPUT is increased to a point identified by 6th in the lever diagram through the power transmission mechanism, and is output to output shaft OUTPUT.

Figure 9:
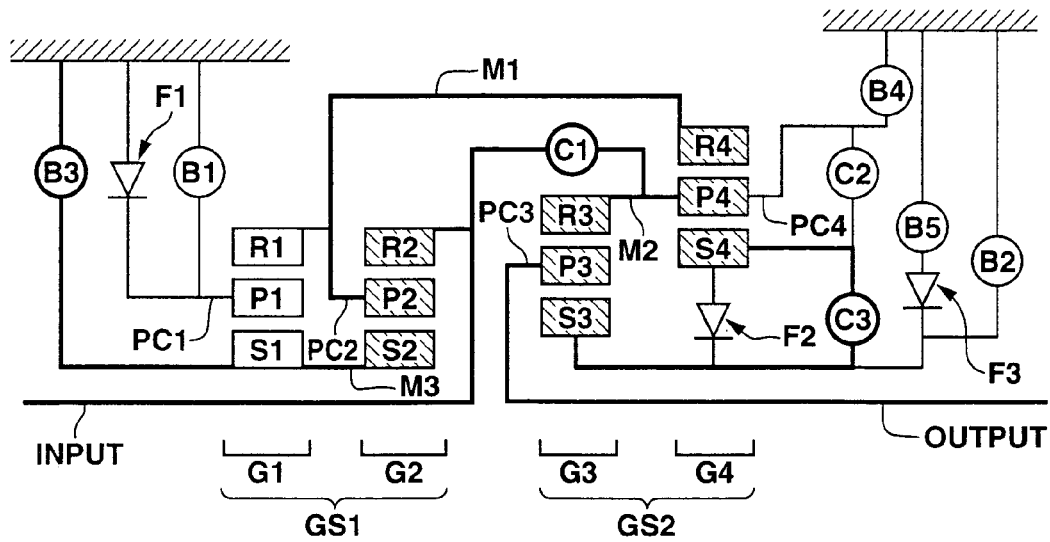
FIG. 9 is a schematic diagram depicting a power flow within the power transmission mechanism of FIG. 1 in the sixth speed.

FIG. 9 shows a power flow or torque flow within the power transmission mechanism in the sixth speed. Power flows through first clutch C1, third clutch C3, third brake B3, first connection member M1, second connection member M2, and third connection member M3, as shown by bold lines. Accordingly, second planetary gear G2 and second planetary gearset GS2 serve for power transmission or torque transmission.

The seventh speed is established by engaging first clutch C1, third clutch C3, and first brake B1, as shown in FIG. 2. Torque is also transmitted via first one-way clutch F1 in parallel with first brake B1.

In the seventh speed, with first clutch C1 engaged, the rotational speed of input shaft INPUT is input to second connection member M2. With first brake B1 engaged, the rotational speed reduced at first planetary gearset GS1 is input via first connection member M1 to fourth ring gear R4. With third clutch C3 engaged, the operating state of second planetary gearset GS2 is determined by the rotational speeds of fourth ring gear R4 and second connection member M2, to output a determined rotational speed via third planet-pinion carrier PC3 to output shaft OUTPUT.

The lever diagram of the power transmission mechanism as shown in FIG. 3 provides another analysis of the seventh speed. The operation of first planetary gearset GS1 is represented by the lever connecting the input point and the engagement point of first brake B1. The intersection point of the lever of first planetary gearset GS1 and the perpendicular line at first ring gear R1 indicates the rotational speed of fourth ring gear R4. The operation of second planetary gearset GS2 is represented by the lever connecting the rotational speed of fourth ring gear R4 and the engagement point of first clutch C1. The intersection point of the lever of second planetary gearset GS2 and the perpendicular line at output shaft OUTPUT indicates the output speed. In the seventh speed, the rotational speed of input shaft INPUT is increased to a point identified by 7th in the lever diagram through the power transmission mechanism, and is output to output shaft OUTPUT.

Figure 10:
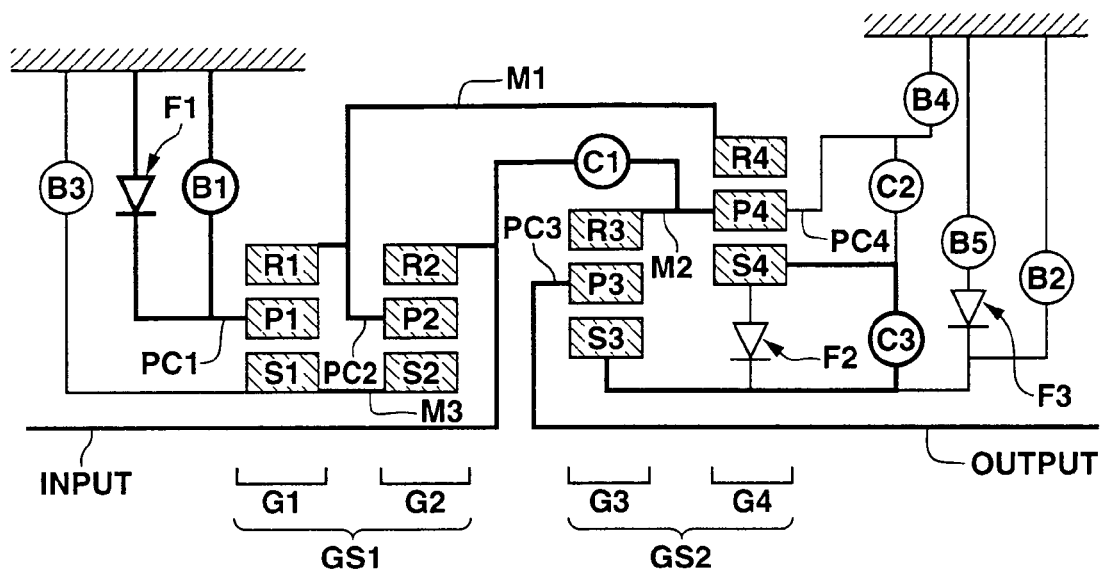
FIG. 10 is a schematic diagram depicting a power flow within the power transmission mechanism of FIG. 1 in the seventh speed.

FIG. 10 shows a power flow or torque flow within the power transmission mechanism in the seventh speed. Power flows through first clutch C1, third clutch C3, first brake B1, first connection member M1, second connection member M2, and third connection member M3, as shown by bold lines. Accordingly, first planetary gearset GS1 and second planetary gearset GS2 serve for power transmission or torque transmission.

The reverse speed is established by engaging third clutch C3, first brake B1, and fourth brake B4, as shown in FIG. 2.

In the reverse speed, with first brake B1 engaged, the rotational speed reduced at first planetary gearset GS1 is input via first connection member M1 to fourth ring gear R4. With third clutch C3 engaged and fourth brake B4 engaged, the operating state of second planetary gearset GS2 is determined by the rotational speeds of fourth ring gear R4 and second connection member M2, to output a determined rotational speed via third planet-pinion carrier PC3 to output shaft OUTPUT.

The lever diagram of the power transmission mechanism as shown in FIG. 3 provides another analysis of the reverse speed. The operation of first planetary gearset GS1 is represented by the lever connecting the input point and the engagement point of first brake B1. The intersection point of the lever of first planetary gearset GS1 and the perpendicular line at first ring gear R1 indicates the rotational speed of fourth ring gear R4. The operation of second planetary gearset GS2 is represented by the lever connecting the rotational speed of fourth ring gear R4 and the engagement point of fourth brake B4. The intersection point of the lever of second planetary gearset GS2 and the perpendicular line at output shaft OUTPUT indicates the output speed. In the reverse speed, the rotational speed of input shaft INPUT is increased to a point identified by Rev in the lever diagram through the power transmission mechanism, and is output to output shaft OUTPUT.

Figure 11:
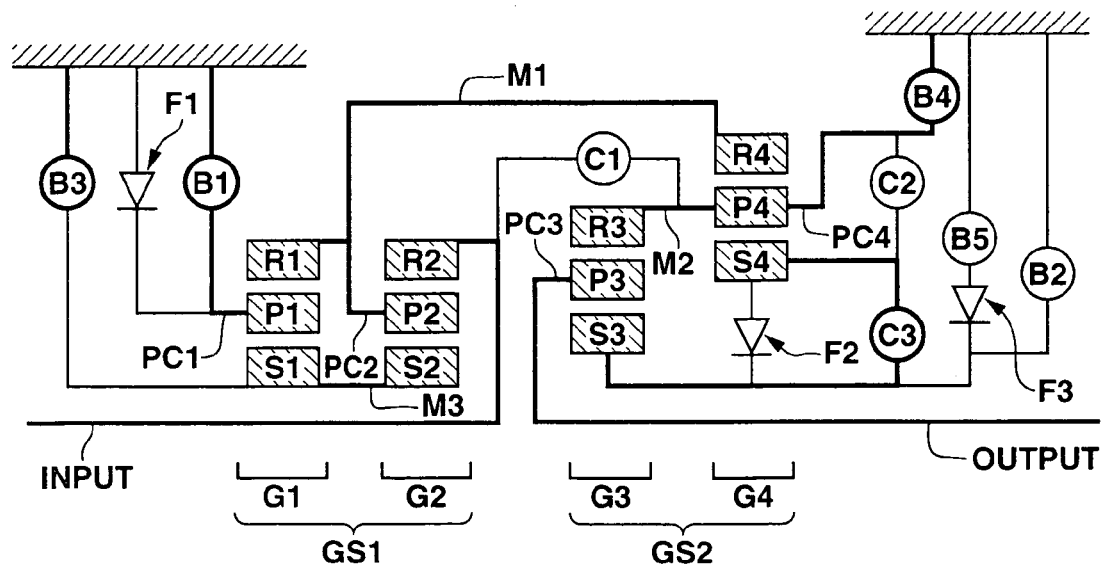
FIG. 11 is a schematic diagram depicting a power flow within the power transmission mechanism of FIG. 1 in the reverse speed.

FIG. 11 shows a power flow or torque flow within the power transmission mechanism in the reverse speed. Power flows through third clutch C3, first brake B1, fourth brake B4, first connection member M1, second connection member M2, and third connection member M3, as shown by bold lines. Accordingly, first planetary gearset GS1 and second planetary gearset GS2 serve for power transmission or torque transmission.

FIGS. 12A through 12C show gear ratios and step ratios established by the power transmission mechanism in three sample cases. In the tables, a1, a2, a3, and a4 indicate the sun-to-ring gear ratios of planetary gears G1, G2, G3, and G4, respectively. A sun-to-ring gear ratio is defined as a ratio of teeth of a sun gear to teeth of a ring gear in a planetary gear.

Figure 13:
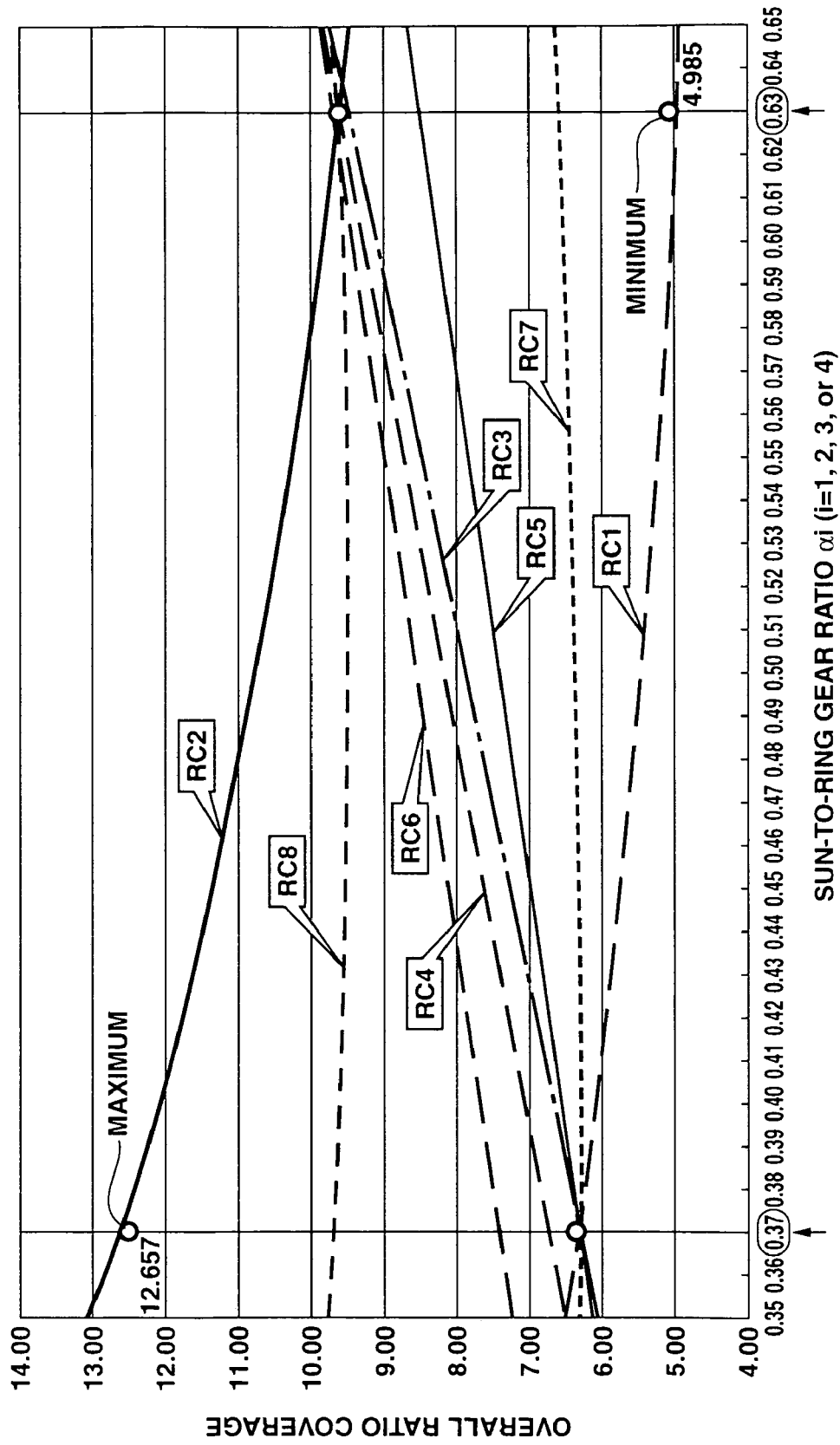
FIG. 13 is a characteristic diagram depicting the overall ratio coverage of the power transmission mechanism of FIG. 1 with respect to the sun-to-ring gear ratio of one of the constituent planetary gears.

FIG. 13 is a characteristic diagram depicting the overall ratio coverage of the power transmission mechanism in accordance with the first embodiment of the present invention with respect to the sun-to-ring gear ratio of one of the planetary gears. The overall ratio coverage is the gear ratio of the first speed divided by the gear ratio of the seventh speed (the highest speed). In FIG. 13, curves RC1 through RC8 each represents a change in the overall ratio coverage with respect to the sun-to-ring gear ratio of one of the planetary gears. Sun-to-ring gear ratios are each specified with a value in a range from 0.37 to 0.63 in the following sample cases.

Curve RC1 represents a change in the overall ratio coverage with respect to the sun-to-ring gear ratio a1 of first planetary gear G1, with a2, a3, and a4 each fixed at a maximum value (ai=0.63, i=2, 3, 4). Curve RC2 represents a change in the overall ratio coverage with respect to the sun-to-ring gear ratio a1 of first planetary gear G1, with a2, a3, and a4 each fixed at a minimum value (ai=0.37, i=2, 3, 4). Curve RC3 represents a change in the overall ratio coverage with respect to the sun-to-ring gear ratio a2 of second planetary gear G2, with a1, a3, and a4 each fixed at a maximum value (ai=0.63, i=1, 3, 4). Curve RC4 represents a change in the overall ratio coverage with respect to the sun-to-ring gear ratio a2 of second planetary gear G2, with a1, a3, and a4 each fixed at a minimum value (ai=0.37, i=1, 3, 4). Curve RC5 represents a change in the overall ratio coverage with respect to the sun-to-ring gear ratio a3 of third planetary gear G3, with a1, a2, and a4 each fixed at a maximum value (ai=0.63, i=1, 2, 4). Curve RC6 represents a change in the overall ratio coverage with respect to the sun-to-ring gear ratio a3 of third planetary gear G3, with a1, a2, and a4 each fixed at a minimum value (ai=0.37, i=1, 2, 4). Curve RC7 represents a change in the overall ratio coverage with respect to the sun-to-ring gear ratio a4 of fourth planetary gear G4, with a1, a2, and a3 each fixed at a maximum value (ai=0.63, i=1, 2, 3). Curve RC8 represents a change in the overall ratio coverage with respect to the sun-to-ring gear ratio a4 of fourth planetary gear G4, with a1, a2, and a3 each fixed at a minimum value (ai=0.37, i=1, 2, 3).

In the first embodiment, the power transmission mechanism has the following functions and effects. (1) There is only input shaft INPUT inside first sun gear S1 and second sun gear S2, so that the power transmission mechanism includes no multiple shaft configuration. Accordingly, the outside diameter of the automatic transmission is retained small, and lubricating oil is thereby supplied enough to the planetary gears, the clutches, and the brakes disposed outside the shaft. In addition, the numbers of bushes and bearings are decreased, so as to improve mountability of the transmission, and to decrease frictions to improve the fuel economy of the vehicle. (2) The power transmission mechanism employs a simple planetary gear as an input section, to improve the productivity and the position accuracy of the planet-pinion carrier in the input section, and thereby to reduce the cost. (3) The overall ratio coverage can be widely adjusted between 4.99 and 12.66 ($0.37 \leq ai \leq 0.63$, i=1, 2, 3, 4), as shown in FIG. 13. Accordingly, the power transmission mechanism may be widely applied to passenger vehicles, sport-utility vehicles, and trucks. Incidentally, the vehicle may employ a wet clutch, instead of a torque converter. (4) Every planetary gear in the power transmission mechanism is a simple planetary gear with no stepped long planet pinion. A stepped long planet pinion whose teeth are difficult to machine tends to increase the manufacturing cost, and to decrease the positioning accuracies of the constituent gears to generate a gear noise to generate a gear noise. In addition, the two stepped sections receive different magnitudes of load from the different associated gears. This unbalanced loads produce a moment of force and a bending moment. Accordingly, the planet pinion and the planet-pinion carrier need to have larger strengths. The power transmission mechanism of this embodiment has no such problem, because every planetary gear in the power transmission mechanism is a simple planetary gear with no stepped long planet pinion. (5) The power transmission mechanism includes two or more overdrive speeds. In recent years, it is desired that the overall ratio coverage is widened to improve the fuel economy. A power transmission configured to establish six or more forward speeds and including only one overdrive speed needs the first gear ratio to be set large in accordance with a desired overall ratio coverage. Accordingly, an output torque in the first speed is large, so that a propeller shaft and a differential needs to be large enough to strengthen the structure. In addition, the final gear ratio needs to be uniquely determined, because the first speed is a low speed. Accordingly, the final gear is difficult to apply to other vehicles. The power transmission mechanism of this embodiment has no such problem, because the power transmission mechanism includes two or more overdrive speeds. (6) A five-speed power transmission mechanism is constructed by removing third brake B3 and first planetary gear G1 from the shown power transmission mechanism. As shown in FIG. 12A, sun-to-ring rear ratios a2, a3, and a4, set for a seven speed transmission, may be suitably used for a five-speed transmission, to establish a proper set of gear ratios. Accordingly, the five-speed transmission and the seven-speed transmission may share a common assembly. (7) In the power transmission mechanism, the rotational speeds of the rotating members and the planet pinions are retained low, resulting in improvements in the durability and the reliability of the power transmission mechanism.

Figures 14, 15:
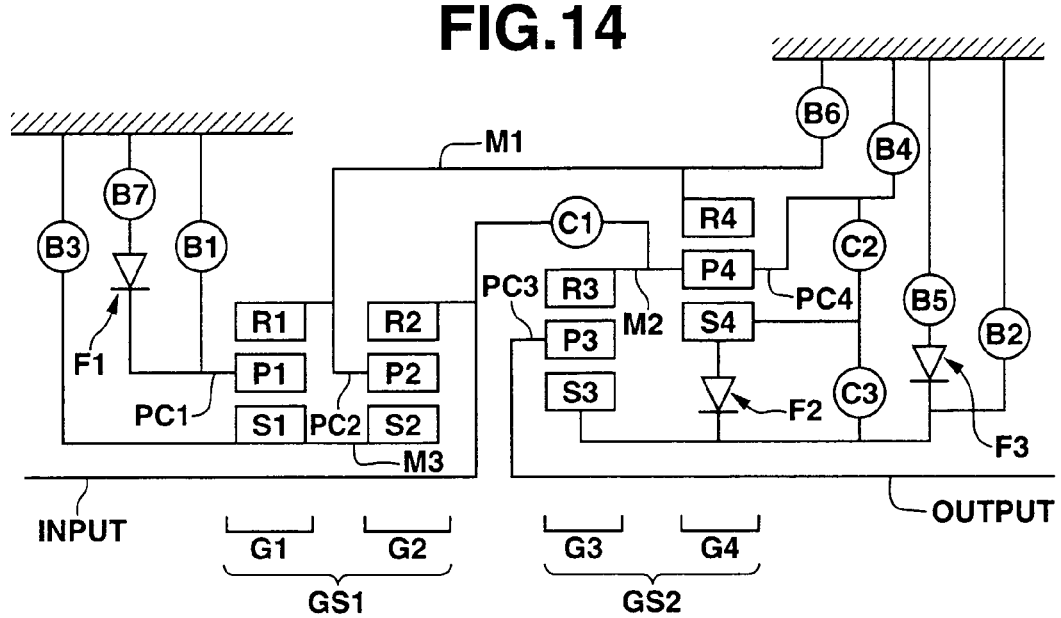
FIG. 14 is a schematic diagram depicting a power transmission mechanism of an automatic transmission for a front-engine, rear-drive vehicle, configured to establish eight forward speeds and one reverse speed, in accordance with a second embodiment of the present invention.
FIG. 15 is shows in tabular form clutch and brake engagements required to establish the eight forward speeds and the reverse speed in the power transmission mechanism of FIG. 14.

FIG. 14 is a schematic diagram depicting a power transmission mechanism of an automatic transmission for a front-engine, rear-drive vehicle, configured to establish eight forward speeds and one reverse speed, in accordance with a second embodiment of the present invention. In addition to the constituent elements as employed in the first embodiment, this power transmission mechanism includes a sixth brake B6 to selectively hold against rotation first connection member M1.

In addition, the power transmission mechanism includes a seventh brake B7 to selectively hold against rotation first one-way clutch F1. However, seventh brake B7 is not essential to establish each speed, because first one-way clutch F1 is not essential to each speed.

Figure 16:
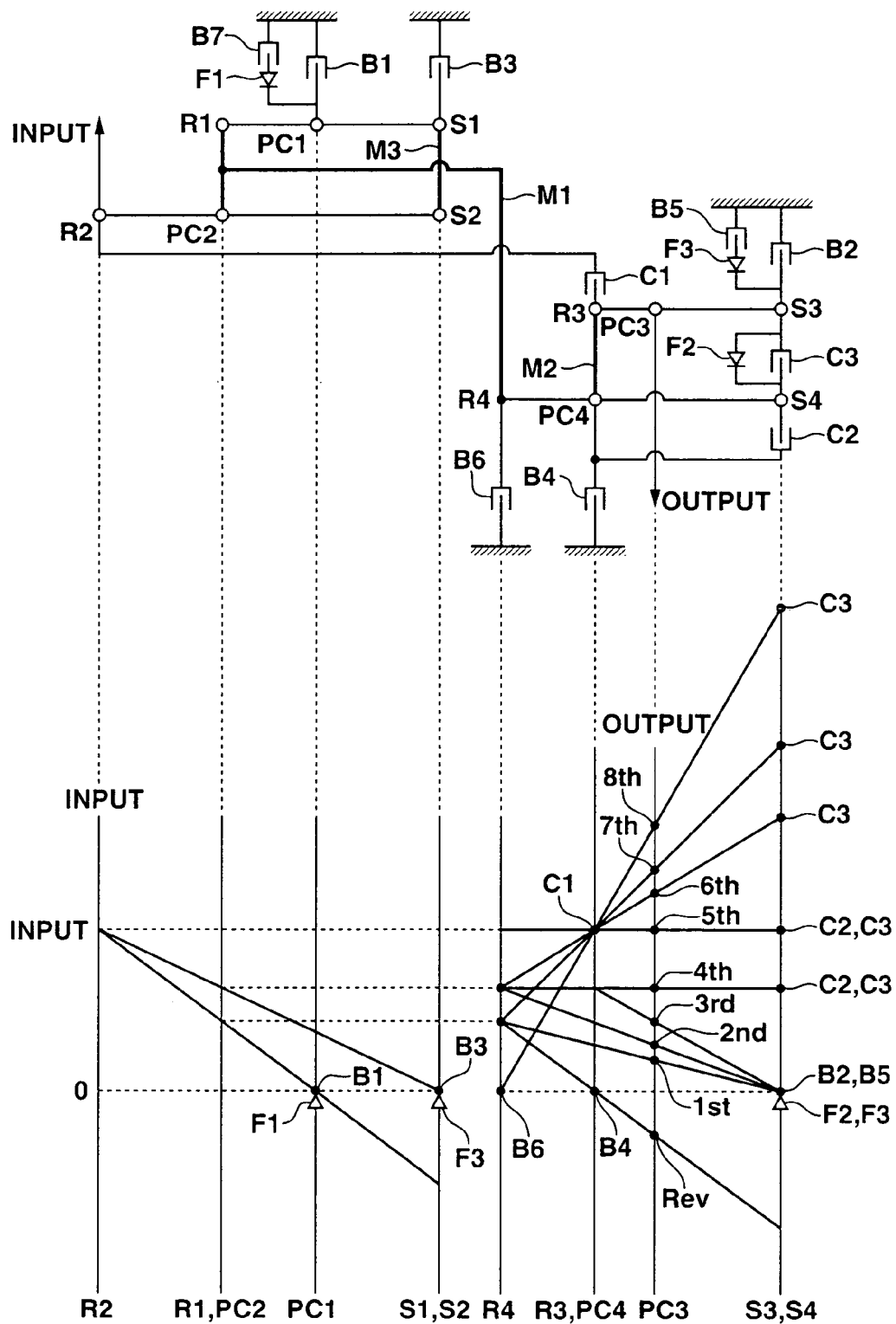
FIG. 16 is a lever diagram depicting the rotational speeds of the rotating members of the power transmission mechanism of FIG. 14 in each speed.
Figures 17, 18A, 18B:
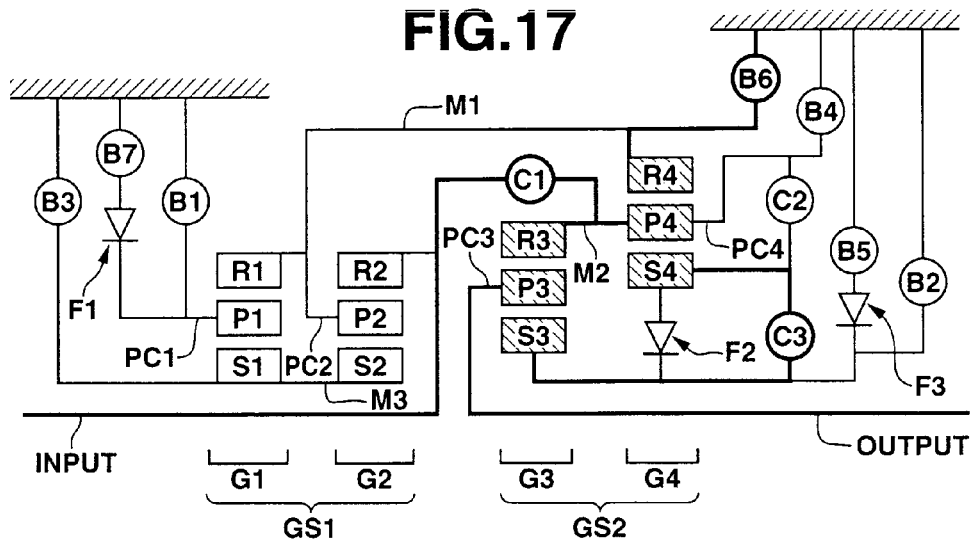
FIG. 17 is a schematic diagram depicting a power flow within the power transmission mechanism of FIG. 14 in the eighth speed.
FIG. 18A shows in tabular form specific gear ratios established by the power transmission mechanism of FIG. 14 in a first sample case.
FIG. 18B shows in tabular form specific gear ratios established by the power transmission mechanism of FIG. 14 in a second sample case.

Referring now to FIGS. 15 through 17, the following describes the operation of the power transmission mechanism in accordance with the second embodiment of the present invention. FIG. 15 is shows in tabular form clutch and brake engagements required to establish the eight forward speeds and the reverse speed in the power transmission mechanism of FIG. 14. FIG. 16 is a lever diagram depicting the rotational speeds of the rotating members of the power transmission mechanism of FIG. 14 in each speed. FIG. 17 is a schematic diagram depicting a power flow within the power transmission mechanism of FIG. 14 in the eighth speed. The power transmission mechanism operates as in the first embodiment in the first speed through the seventh speed, and in the reverse speed. Seventh brake B7, which is added in the second embodiment to serve for torque transmission in the first speed and the seventh speed, is constantly engaged except is in the eighth speed, so as not to be dragged. In FIG. 17, the clutches, the brakes, and the rotating members through which power flows are indicated by bold lines. The gears through which power flows are indicated by a hatch pattern.

The eighth speed is established by engaging first clutch C1, third clutch C3, and sixth brake B6, as shown in FIG. 15.

In the eighth speed, with first clutch C1 engaged, the rotational speed of input shaft INPUT is input to second connection member M2. With sixth brake B6 engaged, fourth ring gear R4 is held stationary against rotation. With third clutch C3 engaged, the operating state of second planetary gearset GS2 is determined by the rotational speeds of fourth ring gear R4 and second connection member M2, to output a determined rotational speed via third planet-pinion carrier PC3 to output shaft OUTPUT.

The lever diagram of the power transmission mechanism as shown in FIG. 16 provides another analysis of the eighth speed. The operation of second planetary gearset GS2 is represented by the lever connecting the engagement point of first clutch C1 and the engagement point of sixth brake B6. The intersection point of the lever of second planetary gearset GS2 and the perpendicular line at output shaft OUTPUT indicates the output speed. In the eighth speed, the rotational speed of input shaft INPUT is increased to a point identified by 8th in the lever diagram through the power transmission mechanism, and is output to output shaft OUTPUT.

FIG. 17 shows a power flow or torque flow within the power transmission mechanism in the eighth speed. Power flows through first clutch C1, third clutch C3, sixth brake B6, and second connection member M2, as shown by bold lines. Accordingly, second planetary gearset GS2 serves for power transmission or torque transmission.

FIGS. 18A and 18B show gear ratios and step ratios established by the power transmission mechanism in two sample cases. In the tables, a1, a2, a3, and a4 indicate the sun-to-ring gear ratios of planetary gears G1, G2, G3, and G4, respectively. Sun-to-ring gear ratios a1, a2, a3, and a4 are same as in the first sample case, and in the second sample case of the first embodiment.

As discussed above, the power transmission mechanism of the second embodiment includes additional sixth brake B6 to selectively hold against rotation second connection member M2, to add the eighth speed faster than the seventh speed of the first embodiment, so that the overall ratio coverage is further increased.

Figures 19, 20:
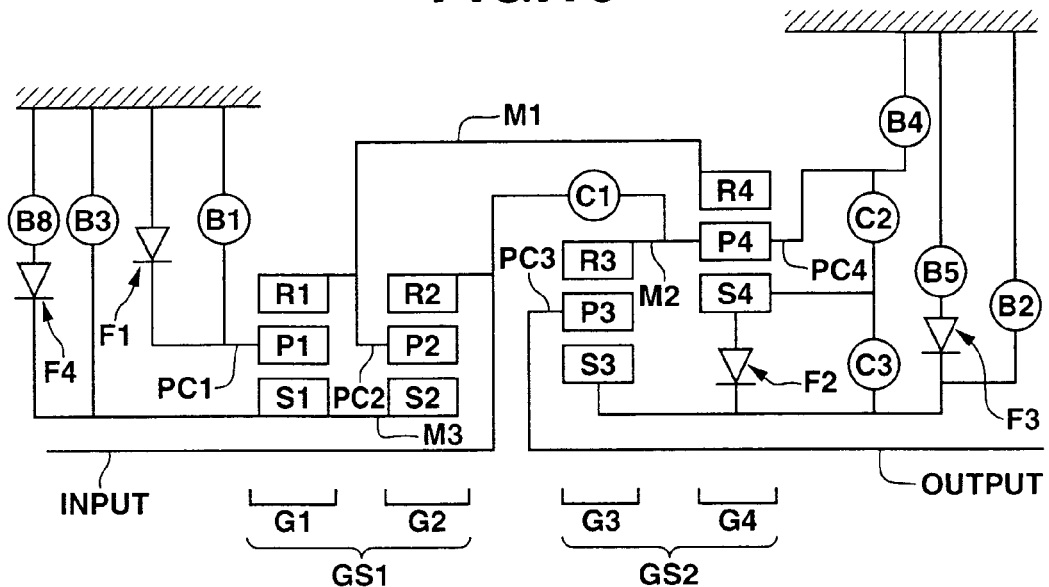
FIG. 19 is a schematic diagram depicting a power transmission mechanism of an automatic transmission for a front-engine, rear-drive vehicle, configured to establish seven forward speeds and one reverse speed, in accordance with a third embodiment of the present invention.
FIG. 20 is shows in tabular form clutch and brake engagements required to establish the seven forward speeds and the reverse speed in the power transmission mechanism of FIG. 19.

FIG. 19 is a schematic diagram depicting a power transmission mechanism of an automatic transmission for a front-engine, rear-drive vehicle, configured to establish seven forward speeds and one reverse speed, in accordance with a third embodiment of the present invention. FIG. 20 is shows in tabular form clutch and brake engagements required to establish the seven forward speeds and the reverse speed in the power transmission mechanism of FIG. 19.

In addition to the constituent elements as employed in the first embodiment, this power transmission mechanism includes an eighth brake B8 and a fourth one-way clutch F4 in parallel to third brake B3. In this embodiment, eighth brake B8 is engaged while third brake B3 is engaged. However, it is not essential to engage both of the brakes. Only eighth brake B8 may be engaged in accordance with a desired capacity of torque transmission.

In the gear shift from the fourth speed to the fifth speed, the transmission controller disengages third brake B3 in advance of starting to engage first clutch C1. After first clutch C1 is fully engaged to bear a specific capacity of torque transmission, fourth one-way clutch F4 is disengaged. In this process, the gear shift is smoothly performed in a suitable timing.

Figures 21, 22:
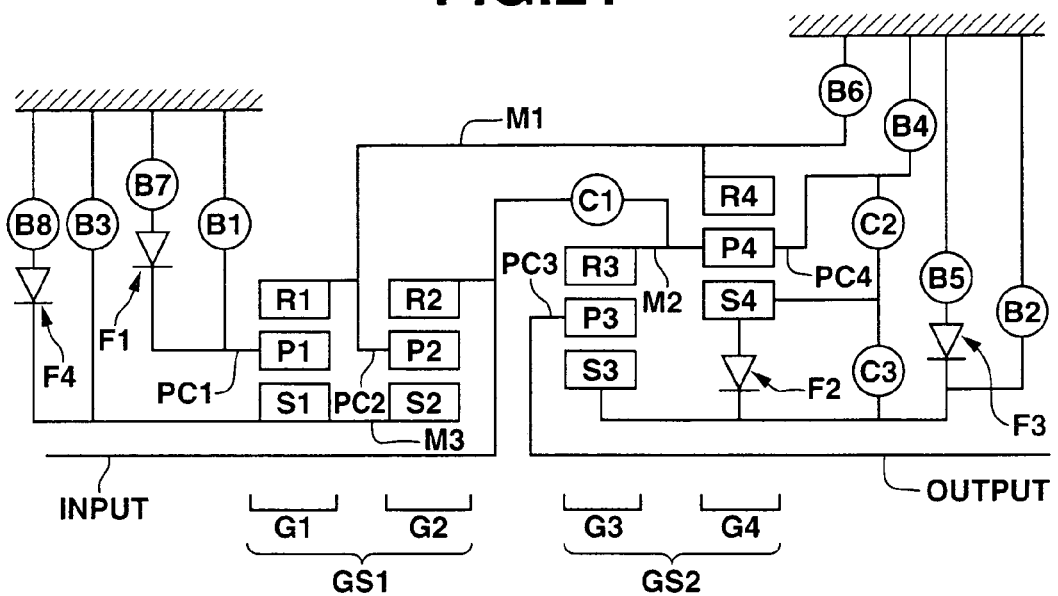
FIG. 21 is a schematic diagram depicting a power transmission mechanism of an automatic transmission for a front-engine, rear-drive vehicle, configured to establish eight forward speeds and one reverse speed, in accordance with a fourth embodiment of the present invention.
FIG. 22 shows in tabular form clutch and brake engagements required to establish the eight forward speeds and the reverse speed in the power transmission mechanism of FIG. 21.

FIG. 21 is a schematic diagram depicting a power transmission mechanism of an automatic transmission for a front-engine, rear-drive vehicle, configured to establish eight forward speeds and one reverse speed, in accordance with a fourth embodiment of the present invention. FIG. 22 shows in tabular form clutch and brake engagements required to establish the eight forward speeds and the reverse speed in the power transmission mechanism of FIG. 21.

In addition to the constituent elements as employed in the second embodiment, this power transmission mechanism includes an eighth brake B8 and a fourth one-way clutch F4 in parallel to third brake B3. This transmission produces same effects as in the third embodiment.

This application is based on a prior Japanese Patent Application No. 2003-392818 filed on Nov. 21, 2003. The entire contents of this Japanese Patent Application No. 2003-392818 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A power transmission mechanism comprising:
   a first planetary gear including a first sun gear, a first ring gear, and a first planet-pinion carrier carrying a first planet pinion in mesh with the first sun gear, and with the first ring gear;
   a second planetary gear including a second sun gear, a second ring gear, and a second planet-pinion carrier carrying a second planet pinion in mesh with the second sun gear, and with the second ring gear;
   a third planetary gear including a third sun gear, a third ring gear, and a third planet-pinion carrier carrying a third planet pinion in mesh with the third sun gear, and with the third ring gear;
   a fourth planetary gear including a fourth sun gear, a fourth ring gear, and a fourth planet-pinion carrier carrying a fourth planet pinion in mesh with the fourth sun gear, and with the fourth ring gear;
   a first connection member rigidly coupling the first ring gear, the second planet-pinion carrier, and the fourth ring gear;
   a second connection member rigidly coupling the third ring gear and the fourth planet-pinion carrier;
   a third connection member rigidly coupling the first sun gear and the second sun gear;
   a first clutch selectively connectable between the second ring gear and the third ring gear;
   a second clutch selectively connectable between the fourth planet-pinion carrier and the fourth sun gear;
   a third clutch selectively connectable between the third sun gear and the fourth sun gear;
   a first brake operable to hold selectively against rotation the first planet-pinion carrier;
   a second brake operable to hold selectively against rotation the third sun gear;
   a third brake operable to hold selectively against rotation the third connection member;
   a fourth brake operable to hold selectively against rotation the second connection member;
   an input shaft connected to the second ring gear; and
   an output shaft connected to the third planet-pinion carrier.

2. The power transmission mechanism as claimed in claim 1, wherein:
   a combination of engaged conditions of the third clutch, the first brake, and the second brake establishes a first speed;
   a combination of engaged conditions of the third clutch, the second brake, and the third brake establishes a second speed;
   a combination of engaged conditions of the second clutch, the second brake, and the third brake establishes a third speed;
   a combination of engaged conditions of the second clutch, the third clutch, and the third brake establishes a fourth speed;
   a combination of engaged conditions of the first clutch, the second clutch, and the third clutch establishes a fifth speed;
   a combination of engaged conditions of the first clutch, the third clutch, and the third brake establishes a sixth speed;
   a combination of engaged conditions of the first clutch, the third clutch, and the first brake establishes a seventh speed; and
   a combination of engaged conditions of the third clutch, the first brake, and the fourth brake establishes a reverse speed.

3. The power transmission mechanism as claimed in claim 1, further comprising a first one-way clutch in parallel with the first brake.

4. The power transmission mechanism as claimed in claim 1, further comprising a second one-way clutch in parallel with the third clutch.

5. The power transmission mechanism as claimed in claim 1, further comprising a fifth brake in parallel with the second brake, and a third one-way clutch in parallel with the second brake and in series with the fifth brake.

6. The power transmission mechanism as claimed in claim 1, further comprising a sixth brake operable to hold selectively against rotation the first connection member.

7. The power transmission mechanism as claimed in claim 6, wherein a combination of engaged conditions of the first clutch, the third clutch, and the sixth brake establishes an eighth speed.

8. The power transmission mechanism as claimed in claim 6, further comprising a seventh brake in parallel with the first brake and in series with the first one-way clutch.

9. The power transmission mechanism as claimed in claim 6, further comprising an eighth brake in parallel with the third brake, and a fourth one-way clutch in parallel with the third brake and in series with the eighth brake.

10. The power transmission mechanism as claimed in claim 1, further comprising an eighth brake in parallel with the third brake, and a fourth one-way clutch in parallel with the third brake and in series with the eighth brake.

* * * * *